(12) United States Patent
Cavagna

(10) Patent No.: US 12,147,251 B2
(45) Date of Patent: Nov. 19, 2024

(54) DEVICE AND METHOD FOR CONTROLLING THE SUPPLY OF A GAS

(71) Applicant: CAVAGNA GROUP S.P.A., Ponte S. Marco di Calcinato (IT)

(72) Inventor: Savio Cavagna, Ponte S. Marco di Calcinato (IT)

(73) Assignee: CAVAGNA GROUP S.P.A., Ponte S. Marco di Calcinato (IT)

( * ) Notice: Subject to any disclaimer, the term of this patent is extended or adjusted under 35 U.S.C. 154(b) by 536 days.

(21) Appl. No.: 17/299,432

(22) PCT Filed: Dec. 12, 2019

(86) PCT No.: PCT/IB2019/060724
§ 371 (c)(1),
(2) Date: Jun. 3, 2021

(87) PCT Pub. No.: WO2020/121253
PCT Pub. Date: Jun. 18, 2020

(65) Prior Publication Data
US 2022/0057816 A1 Feb. 24, 2022

(30) Foreign Application Priority Data
Dec. 12, 2018 (IT) .......................... 102018000011035

(51) Int. Cl.
*G05D 16/06* (2006.01)
*F16K 31/145* (2006.01)

(52) U.S. Cl.
CPC ....... *G05D 16/0691* (2013.01); *F16K 31/145* (2013.01); *F16K 2200/304* (2021.08); *Y10T 137/7782* (2015.04)

(58) Field of Classification Search
CPC ............ G05D 16/0683; G05D 16/0691; F16K 17/06; F16K 2200/304; F16K 2200/145; Y10T 137/7782
USPC ................................................. 137/530, 495
See application file for complete search history.

(56) References Cited

U.S. PATENT DOCUMENTS

| | | | |
|---|---|---|---|
| 4,240,464 A | 12/1980 | Schink | |
| 4,344,456 A * | 8/1982 | Hostetler | G05D 16/0683 137/505.46 |
| 4,991,621 A * | 2/1991 | Steudler, Jr. | G05D 16/08 137/505.46 |

(Continued)

FOREIGN PATENT DOCUMENTS

| | | |
|---|---|---|
| DE | 2400280 A1 | 7/1975 |
| EP | 1103878 A1 | 5/2001 |

*Primary Examiner* — Kevin F Murphy
*Assistant Examiner* — Jonathan J Waddy
(74) *Attorney, Agent, or Firm* — Volpe Koenig

(57) ABSTRACT

A device for controlling the supply of a gas comprises an inlet that can be connected to a gas source, a supply outlet, a regulating chamber communicating with the inlet and outlet, a pressure regulation membrane, means for opening/closing the inlet, and a unit for manually actuating the device, which unit can move with respect to a main axis, wherein the actuation unit is operatively connected to the opening/closing means in order to open/close the inlet, the actuation unit also being operatively connected to the resilient opposition member and comprising means of regulating the resilient opposition member that are capable of varying said opposing force.

14 Claims, 10 Drawing Sheets

(56) References Cited

U.S. PATENT DOCUMENTS

| | | | | |
|---|---|---|---|---|
| 5,070,903 | A * | 12/1991 | Steudler, Jr. | G05D 16/0683 137/505.46 |
| 5,174,331 | A * | 12/1992 | Steudler, Jr. | G05D 16/0683 137/505.46 |
| 5,184,571 | A * | 2/1993 | Hostetler | A01K 39/0213 137/240 |
| 5,358,004 | A * | 10/1994 | Atkinson | G05D 16/0663 137/599.09 |
| 5,429,072 | A * | 7/1995 | Schumacher | G05D 16/0683 137/505.46 |
| 6,712,021 | B2 * | 3/2004 | Pollock | A01K 39/0213 119/72 |
| 7,219,689 | B2 * | 5/2007 | Pollock | G05D 16/0655 137/505.46 |
| 9,004,098 | B2 * | 4/2015 | Roes | F16K 17/02 137/505.41 |
| 2005/0166969 | A1 * | 8/2005 | Olds | G05D 16/0686 137/505.46 |
| 2013/0146157 | A1 * | 6/2013 | Hsiao | G05D 16/0691 137/505.39 |
| 2022/0065448 | A1 * | 3/2022 | Giebel | A47J 37/0713 |

* cited by examiner

DEVICE AND METHOD FOR CONTROLLING THE SUPPLY OF A GAS

TECHNICAL FIELD OF THE INVENTION

The present invention lies within the technical field of manually actuated devices for controlling the supply of gas. In particular, the present invention relates to a device that can be applied to a gas source and that controls the supply thereof and the reduction and/or regulation of the pressure of said supply to an appliance.

The invention also relates to a method for controlling the supply of gas used by such device.

DESCRIPTION OF THE PRIOR ART

In various sectors, it is known to use manually actuated devices that can be connected to a gas source at a predetermined pressure to control the supply thereof to one or more appliances.

A first function of these devices is to enable the user to open/close the flow from the source to said appliance(s), i.e. the typical function of an ON-OFF tap.

Another required function for such devices is to enable the user to regulate the pressure of the flow to the appliance, in particular to reduce the pressure. Examples of these types of devices include control/ignition knobs on gas cooking surfaces or barbecues.

Devices of a known type comprise opening/closing means composed of a Schrader type valve that is operated in order to achieve the effect of regulating the desired pressure.

Further examples are described in DE 24 00 280, U.S. Pat. No. 4,240,464 and EP 1 103 878.

However, the prior art has some limitations and drawbacks.

One drawback of the prior art lies in the difficulty of achieving a level of regulation of the pressure, in terms of precision of the regulation, to satisfactory values.

One particularly pressing need for these devices is to enable a satisfactory level of regulation of the pressure and at the same time simplify the operations required of the user in order to actuate it.

The aim of the present invention is therefore to resolve the drawbacks of the prior art.

One aim of the present invention is to create a manually actuated device for controlling the supply of a gas, capable of enabling a better level of regulation of the pressure than the systems of the known type.

Another aim of the present invention is to create a manually actuated device for controlling the supply of a gas, with greater ease of actuation than the systems of the known type.

It is also the aim of the present invention to provide a device for controlling the supply of a gas that has a robust and reliable structure.

SUMMARY OF THE PRESENT INVENTION

The present invention is based on the general consideration of creating a device for controlling the supply of a gas from a source to an appliance, which device comprises a manual actuation unit in which the actuation unit enables both the opening/closing of the inlet of the device and the regulation of the supply of gas to the appliance.

In a first aspect, the present invention therefore relates to a device for controlling the supply of a gas, the device comprising:
  an inlet that can be connected to a source of a gas that has a predetermined inlet pressure and an outlet for supplying said gas at an outlet pressure, it being possible to connect said outlet to an appliance;
  a regulating chamber that communicates with said inlet and said outlet;
  a pressure regulation membrane arranged in said chamber and a resilient opposition member that is associated with said membrane and generates an opposing force on said membrane when said gas in said chamber compresses said membrane;
  a device for opening/closing said inlet;
  a unit for manually actuating said device, which unit can move with respect to a main axis;
wherein said actuation unit is operatively connected to said opening/closing device in order to open/close said inlet and wherein said actuation unit is also operatively connected to said resilient opposition member and comprises a device for regulating said resilient opposition member, which regulating device varies said opposing force.

In a preferred embodiment, the actuation unit comprises an activation element that can be actuated manually by a user, the activation element being designed to be actuated by means of at least one translation movement along the main axis and by means of at least one rotational movement about the main axis.

Preferably, the activation element comprises a knob.

According to a preferred embodiment of the invention, the regulating device comprises a cam element positioned in contact with the resilient opposition member.

In a preferred embodiment, the cam element is moved by the activation element during said at least one rotational movement.

Based on another aspect, the opening/closing device comprises a lever, preferably a first class lever, in which a first arm of said lever is operatively connected to the actuation unit and a second arm of the lever comprises a portion for obstructing the inlet.

According to a preferred embodiment of the invention, the actuation unit is operatively connected to the lever by means of an actuation shaft.

Preferably, the actuation shaft is moved by the activation element during said at least one translation movement.

In a preferred embodiment, the resilient opposition member comprises a helical spring.

In some embodiments, the opening/closing device comprises a first element that comprises an opposing portion that defines a thrust element rigidly connected to the activation element.

Preferably, the opening/closing device can also comprise an indexer disc and a reference opening through which the thrust element can pass.

Based on an additional aspect, the opposing portion and the opening can be designed so that:
during an opening action, or phase, the activation element can be actuated by means of a translation movement in a first direction along the main axis, bringing the device from a second operative position, in which the thrust element is not in contact with the cam element and the first element is not in contact with the shaft, to a third operative position in which the first element is in contact with the shaft so as to move the shaft and the obstructing portion in order to supply gas through the supply outlet at a predetermined outlet pressure;

during a regulating action, or phase, the first element can move by means of the rotational movement about said main axis from the third operative position to a fourth operative position, during which rotational movement the thrust element abuts the cam element to cause it to translate, so as to vary the opposing force and the outlet pressure in relation to the predetermined outlet pressure.

In a second aspect, the present invention concerns a method for controlling the supply of a gas between a source and an appliance by means of a device according to the above description, in which the method comprises the steps of:

actuating said actuation unit by means of a first translation movement in a first direction along said main axis in order to open said inlet and initiate the supply of gas to said appliance through said supply outlet at a predetermined outlet pressure;

actuating said actuation unit by means of a rotational movement about said main axis in order to regulate the magnitude of said outlet pressure.

Preferably, the method also comprises actuating said actuation unit by means of a translation movement in a second direction along said main axis, opposite to said first direction, in order to close said inlet and stop the supply of gas.

Preferably, the method comprises a release step before said first translation movement of said actuation unit, in which step the actuation unit is actuated by means of a rotational movement about the main axis.

BRIEF DESCRIPTION OF THE FIGURES

Further features and advantages of the present invention will emerge from the following preferred but not exclusive embodiment, given by way of non-limiting example, with reference to the accompany drawings.

In particular, in the drawings.

DETAILED DESCRIPTION OF AN EMBODIMENT OF THE PRESENT INVENTION

Figure 1:
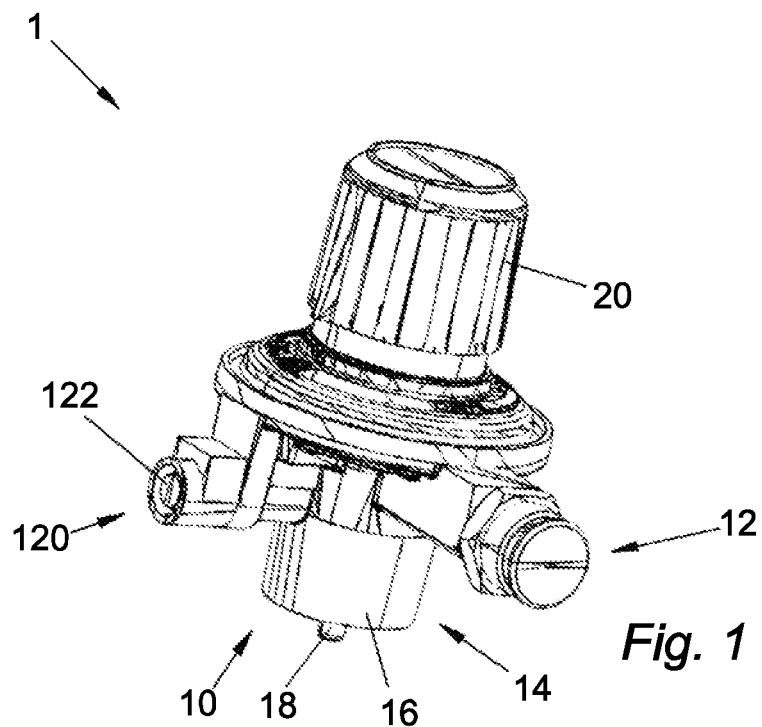
FIG. 1 shows an axonometric view of the control device according to a preferred embodiment of the invention.
Figure 2:
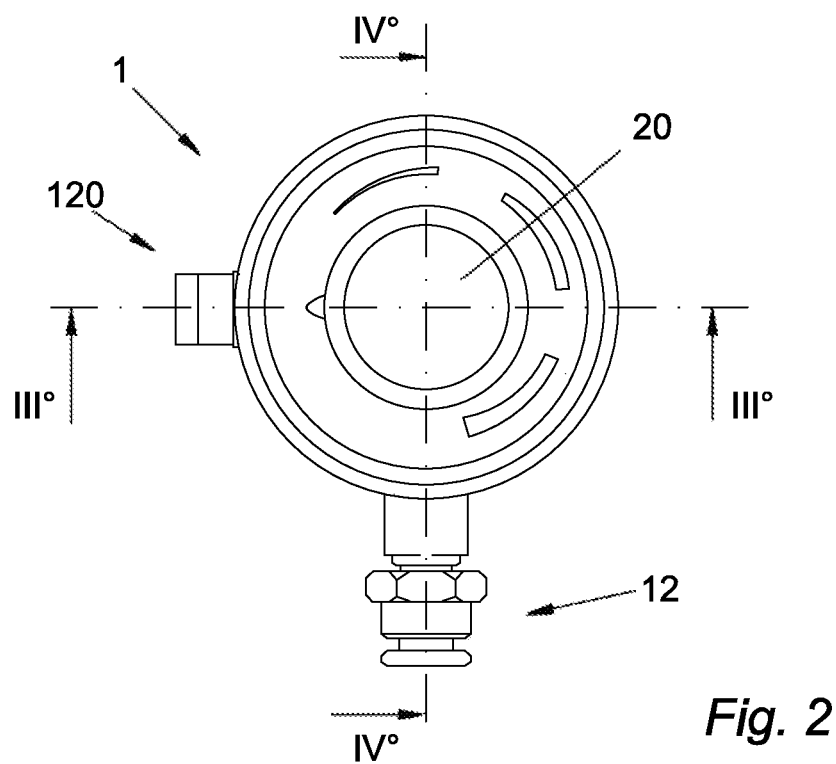
FIG. 2 shows a plan view from above of the device in FIG. 1.
Figure 2A:
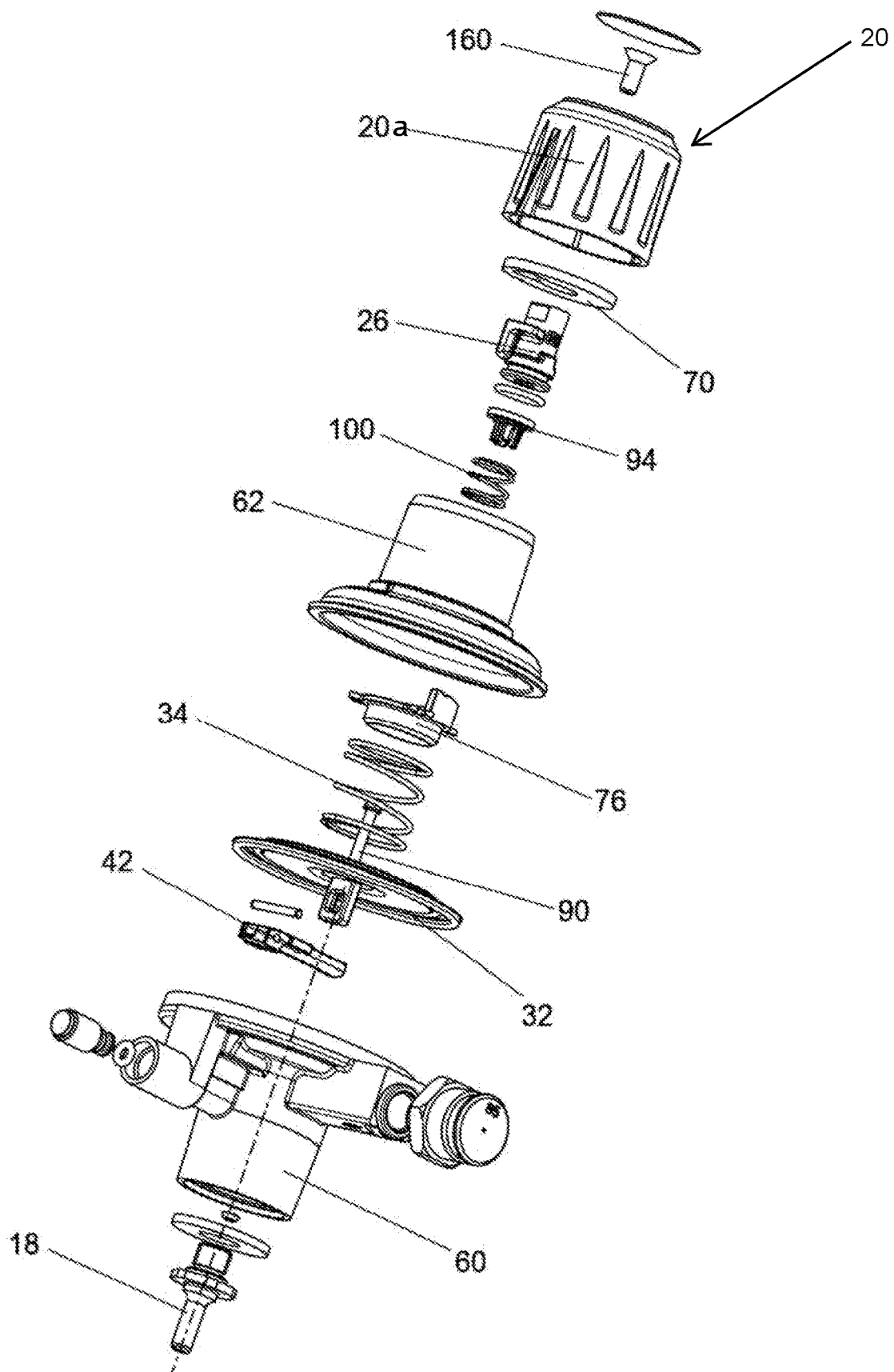
FIG. 2A shows an exploded view of FIG. 1.

Although the present invention is described below with reference to its embodiment shown in the drawings, the present invention is not limited to the embodiment described below and represented in the drawings. The present invention is particularly advantageous in the creation of a device for controlling the supply of a gas for a barbecue.

It must be pointed out, however, that the present invention is not limited to this embodiment. On the contrary, the present invention can be advantageously applied in all those cases that require a device that can be connected to a source of gas at a predetermined pressure in order to control the supply thereof to one or more appliances.

FIG. 1 shows a control device 1 according to a preferred embodiment of the invention.

As stated, the control device 1 is particularly suitable for use in a barbecue, that is to say preferably interposed between a gas source, for example an LPG gas cylinder (not shown), and an appliance composed of a cooking surface/plate (not shown).

For this purpose, the control device 1 preferably comprises an inlet 10 that can be connected to the gas source and a gas supply outlet 12 that can be connected to the appliance.

The inlet 10 of the device 1 is preferably defined in an appropriate device 14 for connecting said device 1 to the gas source. In particular, the connection device 14 preferably comprises a cylindrical sleeve 16 that can be coupled directly to a corresponding sleeve connected to the outlet of a cylinder.

In alternative embodiments, the connection device may be designed differently.

At the inlet 10 of the device 1, an elongate piston 18 is preferably provided. When the device 1 is connected to the corresponding sleeve on the cylinder, the elongate piston cooperates with a safety valve present on the cylinder, not shown in the figures, which is automatically opened by said piston 18.

The device 1 according to the present embodiment preferably comprises a refilling device 120 capable of enabling the gas source (cylinder) to be refilled when the device 1 is connected to said source.

The refilling device preferably comprises an element 122 for closing a refilling path 124 at the inlet 10.

The function of the device 1 is to control the pressure of the gas at the supply outlet 12 in relation to the pressure of the gas coming from the source.

The control function of the device 1 is performed in a first supply commencement action, substantially an ON-OFF function, and a subsequent regulation of the outlet gas pressure depending, for example, on the heat intensity required by the appliance.

Control is preferably performed manually by the user via an actuation unit 20, which in preferred embodiments comprises an activation element 20A, preferably a knob, having the designs described more clearly below.

Firstly, the device 1 comprises a main body 61 that defines an intermediate regulating chamber 30 communicating with the inlet 10 and the outlet 12 of the device 1.

During the operation of the device 1, the gas coming from the inlet 10 at a predetermined pressure flows into the regulating chamber 30 and is supplied at the supply outlet 12 to the appliance at a lower pressure.

The device 1 preferably comprises the opening/closing device 40 of the inlet 10 that performs the ON-OFF function for the device 1.

In some embodiments, the opening/closing device 40 comprises a portion 48 for obstructing the inlet 10 that can be selectively moved away from/close to the inlet 10 in order to allow or prevent gas from passing through it.

Preferably, the opening/closing device 40 comprises a lever 42 that, in some embodiments, is a first class lever.

A first arm 44 of the lever 42 is operatively connected to the actuation unit 20 and the other arm 46, or second arm 46, may comprise the portion 48 for obstructing the inlet 10. The rotation of the lever 42 about its fulcrum 42a, using the methods described more clearly below, allows or interrupts the flow of gas from the inlet 10 to the regulating chamber 30. More generally, however, the actuation unit can be designed so as to be operatively connected to the opening/closing device 40 for opening/closing the inlet 10. Positioned in the regulating chamber 30 is a pressure regulation membrane 32 while a resilient opposition member 34 is associated with the membrane 32. The resilient member 34 is capable of generating an opposing force on the membrane 32 when the gas that flows into the chamber 30 from the inlet 10 compresses said membrane 32.

The action of the membrane 32 inside the regulating chamber 30 reduces the pressure of the gas at the supply outlet 12 in relation to the pressure of the gas at the inlet 10. The extent of reduction of the pressure between the inlet and outlet depends on the opposing force exerted by the resilient member 34. By varying the opposing force exerted by the resilient member 34 on the membrane 32, it is possible to vary the pressure of the gas at the supply outlet 12.

Preferably, the resilient member 34 comprises a helical spring.

According to one aspect of the present invention, the device 1 preferably comprises a device 50 for regulating the resilient opposition member 34, which device is capable of varying the opposing force generated by said means on the membrane 32.

Preferably, the actuation unit 20 is operatively connected to the resilient opposition member 34 and comprises said regulating device 50. By acting on the actuation unit 20, in practice by appropriately actuating the knob 20, the desired regulation of the pressure at the supply outlet 12 is achieved in order to obtain the desired value.

Preferably, the main body 61 comprises a lower body 60, where preferably the inlet 10, the regulating chamber 30 and the supply outlet 12 are defined, and an upper body 62 coupled to said lower body 60. The regulation membrane 32 is preferably arranged between the lower body 60 and upper body 62. The upper body 62 preferably has a substantially cylindrical hollow end portion 64.

The activation element 20A also preferably has a substantially cylindrical shape and is mounted on the end portion 64 of the upper body 62.

The activation element 20a preferably extends about a main axis X.

The activation element 20a can move in relation to the main axis X, both in translation along the main axis X and in rotation about the main axis X.

Figure 7:
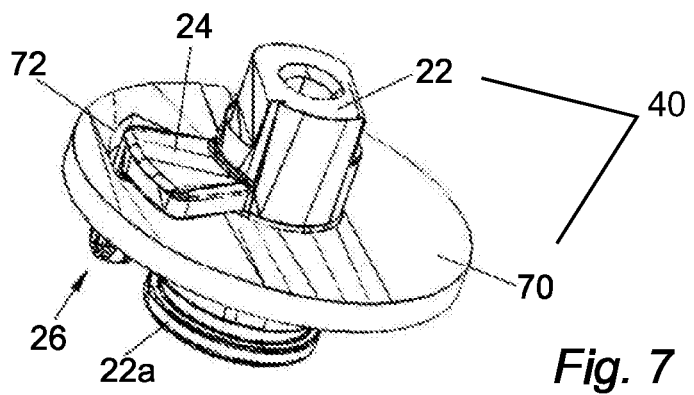
FIG. 7 shows 2 elements from FIG. 5, isolated from the rest.
Figure 8:
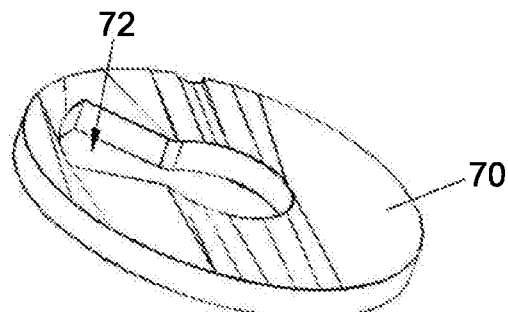
FIG. 8 shows only the first element of FIG. 7.

Fixed to the end portion 64 of the upper body 62 is an indexer element 70 comprising a reference opening 72, more clearly illustrated in FIGS. 7 and 8. The reference opening 72 preferably has a circular sector shape.

Figure 9:
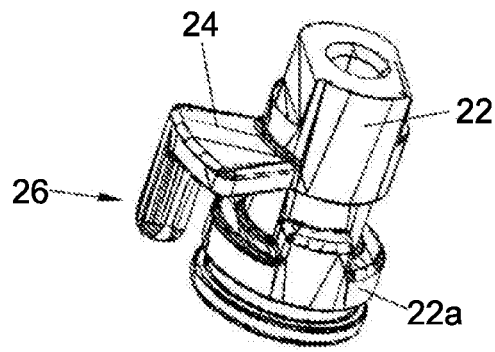
FIG. 9 shows only the second element of FIG. 7.
Figure 10:
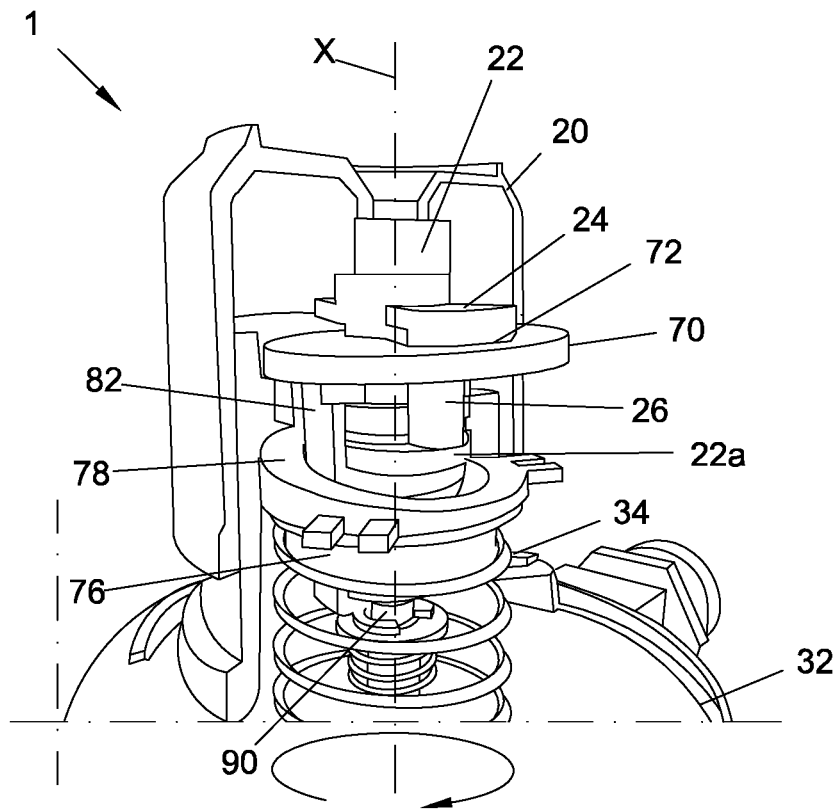
FIG. 10 shows a partially cutaway view of the device in FIG. 1 in a second operative position.
Figure 11:
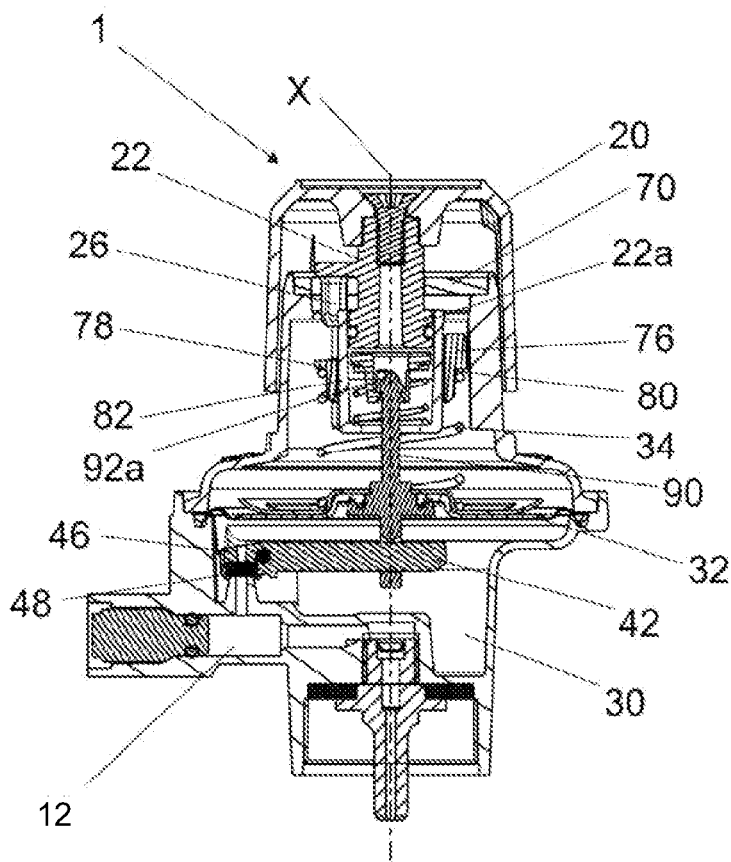
FIG. 11 shows the cross-sectional view of the device in the second operative position in FIG. 10 along the section plane III-III shown in FIG. 2.
Figure 12:
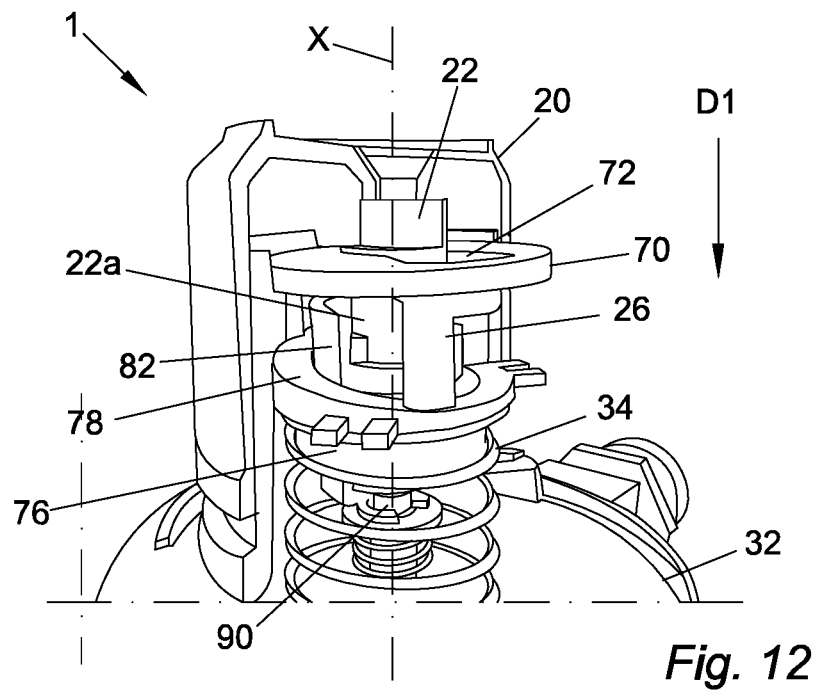
FIG. 12 shows a partially cutaway view of the device in FIG. 1 in a third operative position.
Figure 13:
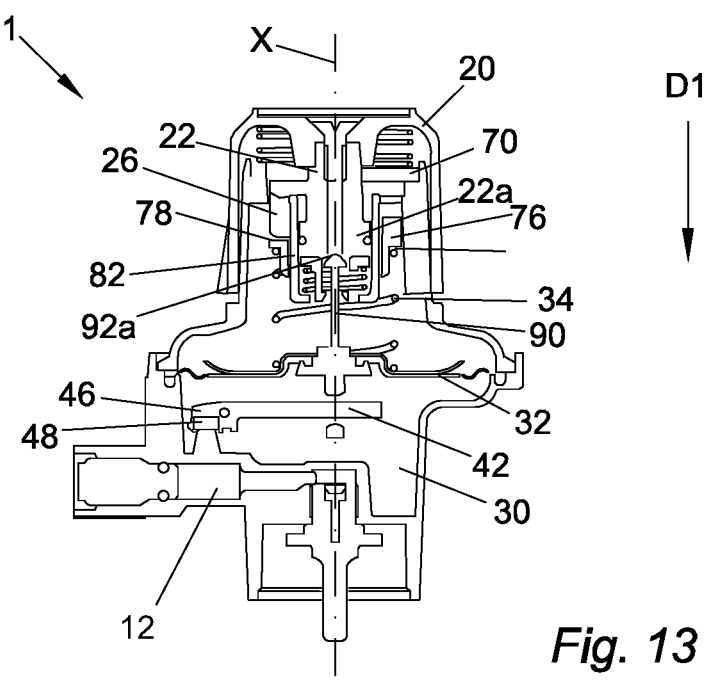
FIG. 13 shows the cross-sectional view in the third operative position in FIG. 12 along the section plane III-III shown in FIG. 2.

A first element 22, more clearly illustrated in FIGS. 7 and 9, is rigidly connected to the activation element 20a. The first element 22 is integrally connected to the activation element 20a, preferably by means of a screw 160.

The first element 22 comprises an opposing portion 24 of a shape that is preferably complementary to the reference opening 72, more preferably of a circular sector shape. A thrust element 26 is defined on the opposing portion 24. More generally, the opening 72 is shaped so that the thrust element 26 can pass through it when they are aligned, that is to say when the first element 22 is positioned, by the rotation of the activation element 20A, in a predetermined angular position about the main axis X. The shape and dimensions of the reference opening 72 are instead such that, in other angular positions, the thrust element 26 faces a solid surface of the indexer element 70.

In some embodiments a regulating bush 76 may be present between the first element 22 of the knob 20 and the helical spring 34. The regulating bush 76 comprises an inclined surface in relation to the main axis X, which surface defines a cam element 78 arranged facing the thrust element 26 of the opposing portion 24.

The regulating bush 76 also comprises an abutment surface 80 which is arranged facing the resilient member 34 and capable of receiving a first end 34a of the helical spring 34 in abutment. The other end 34b of the resilient member 34 abuts the membrane 32 in order to exert said opposing force.

The first element 22 comprises a preferably cylindrical central portion 22a, received inside a hollow body 82 where it can slide along the main axis X. Preferably housed between the central portion 22a and the hollow body 82 is a sealing element 84 capable of reducing the play of the knob, as well as encouraging the reciprocal sliding of the parts.

Said regulating bush 76 is slidably mounted externally on the hollow body 82 so as to be able to slide along the main axis X too.

In some embodiments, an actuation shaft 90 is rigidly connected to the membrane 32.

Figure 3:
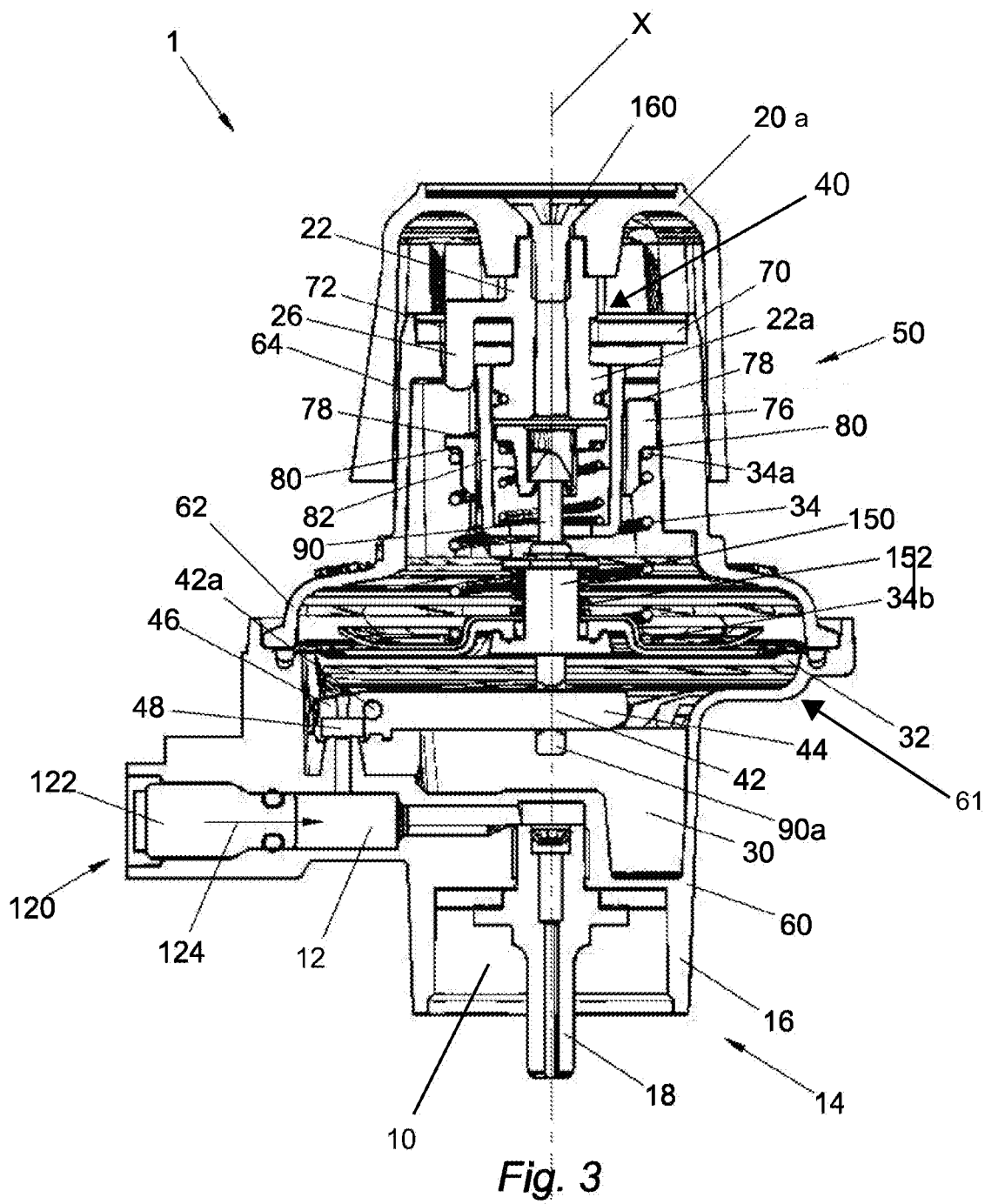
FIG. 3 shows a cross-sectional view of FIG. 2 along the section plane III-III.
Figure 3A:
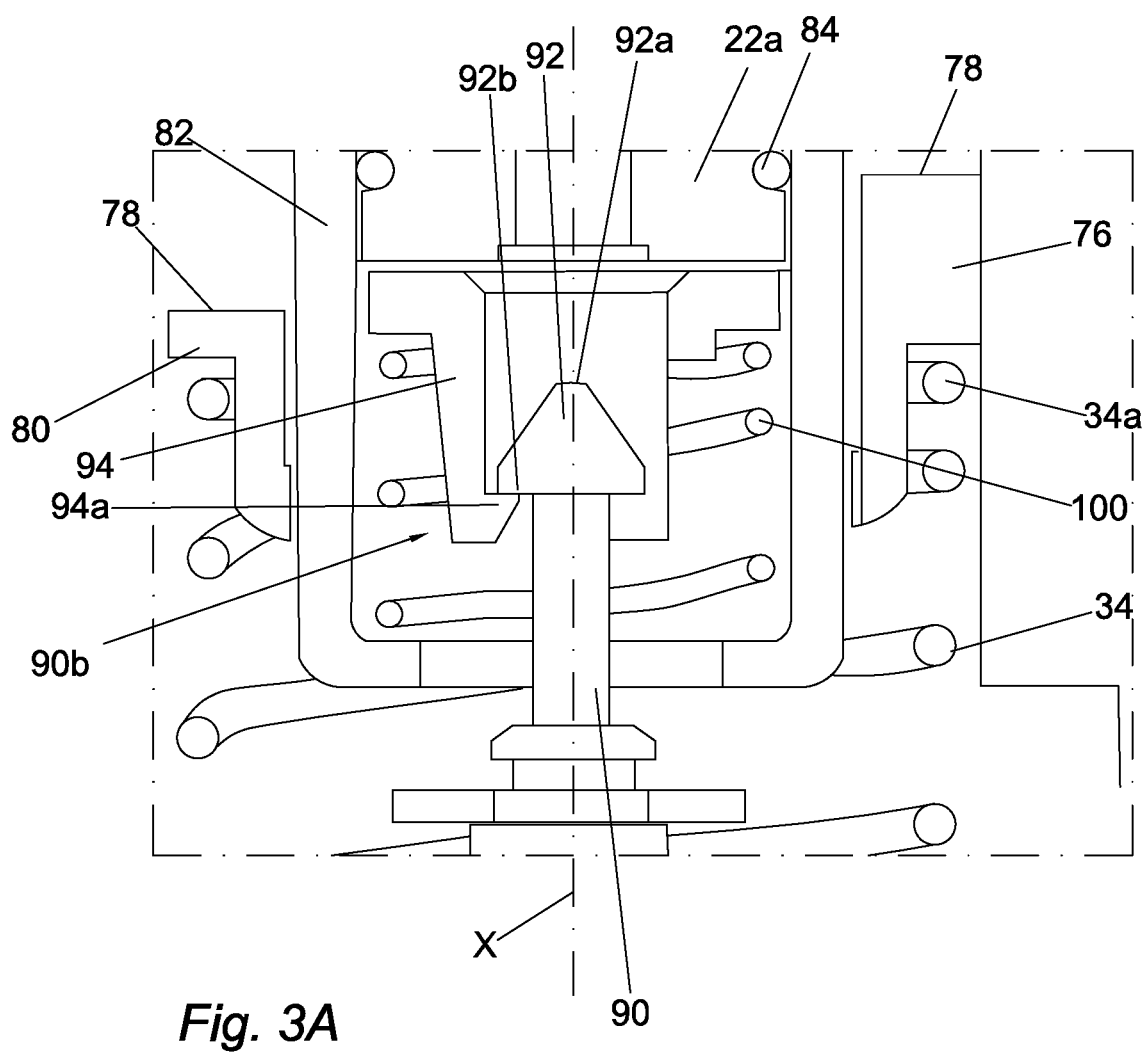
FIG. 3A shows an enlarged detail of FIG. 3.
Figure 4:
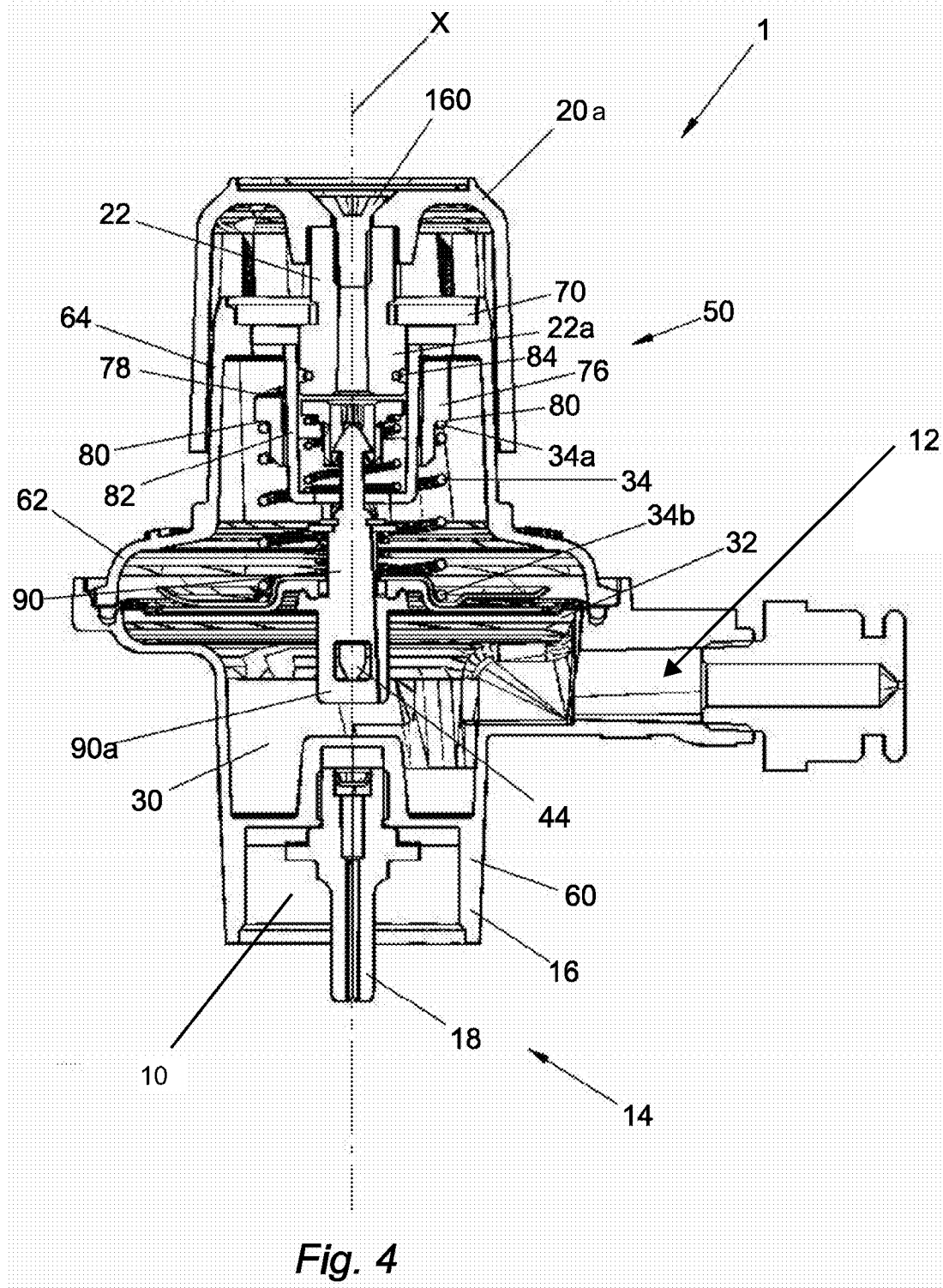
FIG. 4 shows the cross-sectional view of FIG. 2 along the section plane IV-IV.
Figure 5:
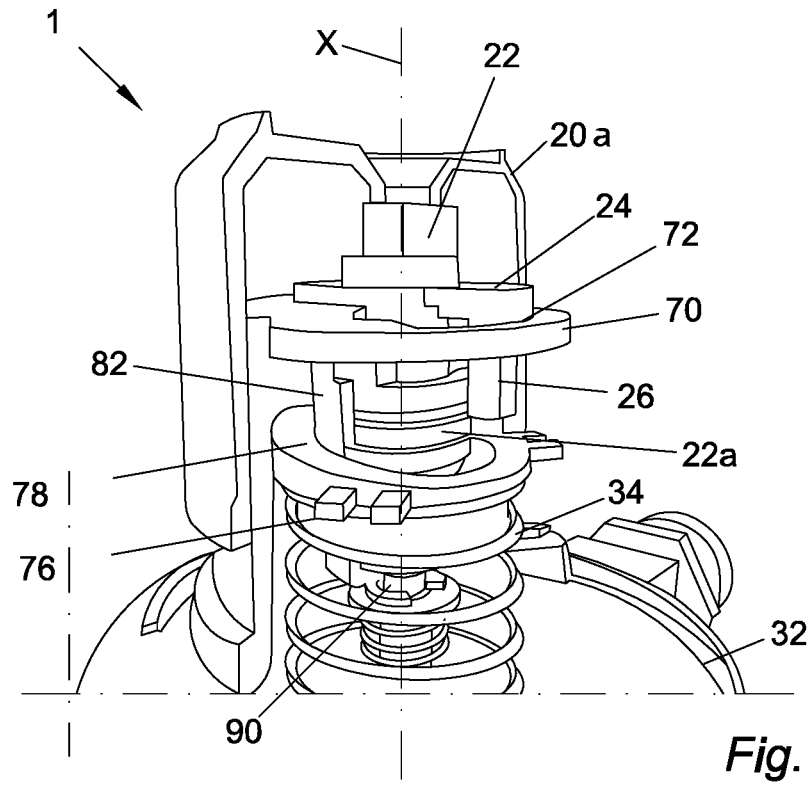
FIG. 5 shows a partially cutaway view of the device in FIG. 1 in a first operative position.
Figure 6:
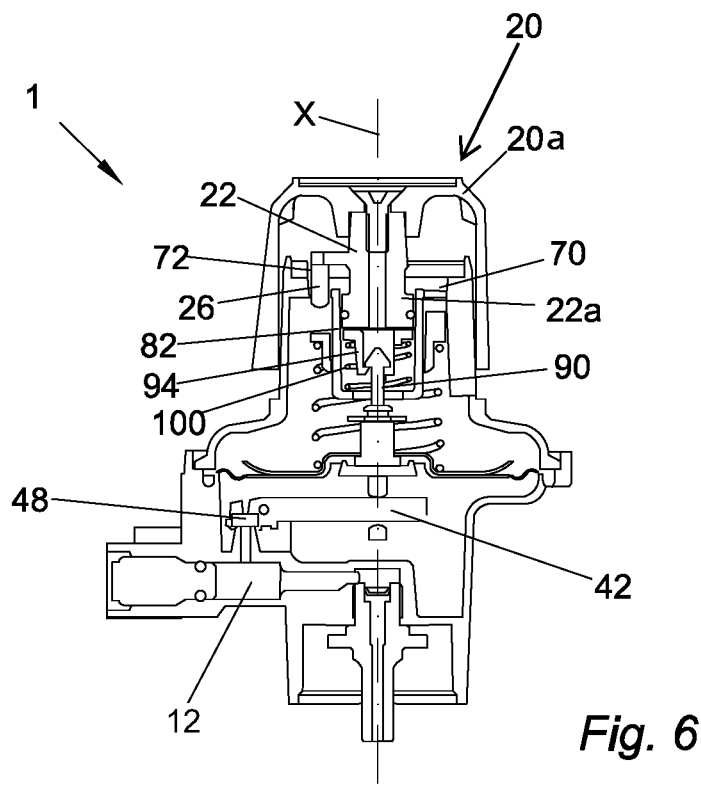
FIG. 6 shows the cross-sectional view of the device in the first operative position in FIG. 5 along the section plane III-III shown in FIG. 2.

According to another aspect, the shaft 90 is connected at its first end 90a to the first arm 44 of the lever 42 and interacts at its second end 90b with the central portion 22a of the first element 22, more clearly shown in detail in FIG. 3A.

Preferably, the actuation shaft 90 passes centrally through the membrane 32. In some embodiments, the second end 90b of the actuation shaft 90 comprises a widened portion 92 having an end 92a capable of being pushed by the central portion 22a of the first element 22, and an undercut region 92b. The widened portion 92 is received inside a preferably cylindrical bush 94. The bush 94 also comprises an abutment surface 94a capable of coming into contact with the undercut region 92b of the widened portion 92 of the actuation shaft 90.

The bush 94 is also received inside the hollow body 82 where it can slide along the main axis X. A resilient thrust means 100, preferably a helical spring, acts on the bush 94 in order to hold it thrusting against the first element 22.

As can be seen in FIG. 3, in some embodiments, a sleeve 150 and a spring 152 are present on the actuation shaft 90 in the region where it passes through the membrane 32, which sleeve and spring form part of a safety valve that actuates automatically if the pressure inside the regulator exceeds a set value. The actuation of the safety valve releases a quantity of gas to the outside, which allows the pressure inside the regulator to return below the set value. For greater clarity of representation, in some of the figures the sleeve 150 and the spring 152 have been omitted since the presence of the relative safety valve is purely optional.

With reference to FIGS. 5 to 15, the operation of the device 1 is described below according to the preferred embodiment of the invention.

The operation of the device 1 is described by imagining that it is appropriately connected at the inlet 10 to the gas source and at the supply outlet 12 to the appliance, although the source and appliance have not been shown for the sake of simplifying the figures.

In the situation of non-use (FIGS. 5 to 9), the knob 20 is in a safety position so that the first element 22, integral therewith, cannot translate along the main axis X. In this first operative position of the device 1, the opposing portion 24 of the first element 22 is decentralised in relation to the reference opening 72 of the indexer disc 70, as shown more clearly in FIG. 7. The first element 22 is therefore in its extreme position, towards the top with reference to the figures, and with the central portion 22a inside the hollow body 82 which is also in its extreme upper position. In this condition, the bush 94 is held thrusting against the first element 22 by the resilient means 100. The actuation shaft 90 is also in its extreme upper position thanks to the action of the abutment surface 94a against the undercut region 92b of the widened portion 92 of the actuation shaft 90. The actuation shaft 90 in its extreme upper position holds the lever 42 in the closed position, that is to say with its obstructing portion 48 closing the inlet 10. The device 1 in this first operative position of non-use is therefore closed (OFF).

In a subsequent phase (FIGS. 10 and 11), the knob 20 is rotated about the main axis X by a predetermined angle, bringing the device 1 into a second operative position. The angle of rotation of the knob 20 is determined by appropriate end-of-travel means of the knob 20.

The amplitude of this angle is such that the first element 22 is rotated to a position in which the opposing portion 24 is aligned with the reference opening 72 of the indexer element 70 and, for the reasons previously explained, the thrust element can pass through the opening 72.

In the second operative position, the thrust element 26 is not in contact with the cam element 78 and the first element 22 is not in contact with the shaft 90. Preferably, the first element 22 is still in its extreme position, towards the top with reference to the figures, and with the central portion 22a inside the hollow body 82, also in its extreme upper position. According to another aspect, the actuation shaft 90 also remains in its extreme upper position and the lever 42 in the position of closing the inlet 10. The device 1 in this second operative position is therefore still closed but released ready for actuation.

In a subsequent phase (FIGS. 12 and 13), also defined below as the opening phase, the activation element 20a is pushed, that is to say actuated by means of a translation movement in a first direction, indicated by D1 in the figures, along the main axis X, bringing the device 1 into a third operative position. According to a preferred aspect of the invention, in this phase the first element 22 is also pushed in the same direction D1 until reaching an end-of-travel position, shown in FIGS. 12 and 13.

In the third operative position, the first element 22 is brought into contact with the shaft 90 so as to move the shaft 90 and the obstructing portion 48 into a position that enables the supply of gas through the supply outlet 12 at a predetermined outlet pressure.

Preferably, during its translation along the axis X, the central portion 22a of the first element 22 acts on the end 92a of the widened portion 92 of the second end 90b of the actuation shaft 90 and pushes said shaft 90 towards a corresponding end-of-travel position.

In some embodiments, during the translation, the actuation shaft 90 acts on the lever 42 bringing it into the opening position, that is to say with its obstructing portion 48 of the second arm 46 away from the inlet 10 (ON).

The device 1 is therefore activated, with the gas coming from the inlet 10 flowing into the regulating chamber 30 and supplied to the appliance through the supply outlet 12.

In this third operative position, the gas is supplied to the appliance at a desired minimum pressure P1, and in any event lower than the pressure of the source.

The extent of the pressure supplied depends on the pressure inside the regulating chamber 30 which depends, as stated, on the opposing force on the membrane 32 that is exerted by the resilient opposition member 34.

In the condition shown, the opposing force exerted by the resilient opposition member 34 is determined by the position of the regulating bush 76, the first end 34a of the helical spring 34 being in contact with the abutment surface 80 of said bush 76.

Still in the same operative condition, the thrust element 26 of the first element 22 is placed in contact with the inclined surface 78 (cam element) of the regulating bush 76, maintaining the fixed position of the regulating bush 76 and therefore maintaining the extent of compression of the helical spring 34, which is in contact with the regulating bush 76, at a predetermined minimum value.

From this third operative position of normal operation in which the gas is supplied to the appliance at the maximum desired pressure P1, the user, according to a first advantageous aspect of the invention, can act on the activation element 20a in order to regulate the intensity of the pressure to the appliance.

Figure 14:
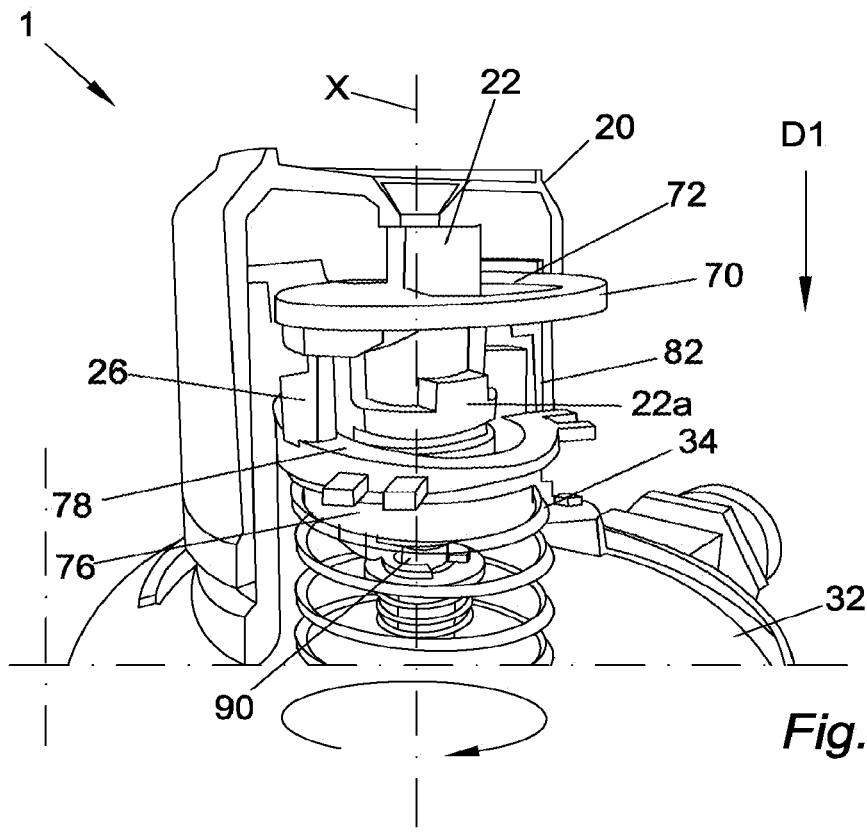
FIG. 14 shows a partially cutaway view of the device in FIG. 1 in a fourth operative position.
Figure 15:
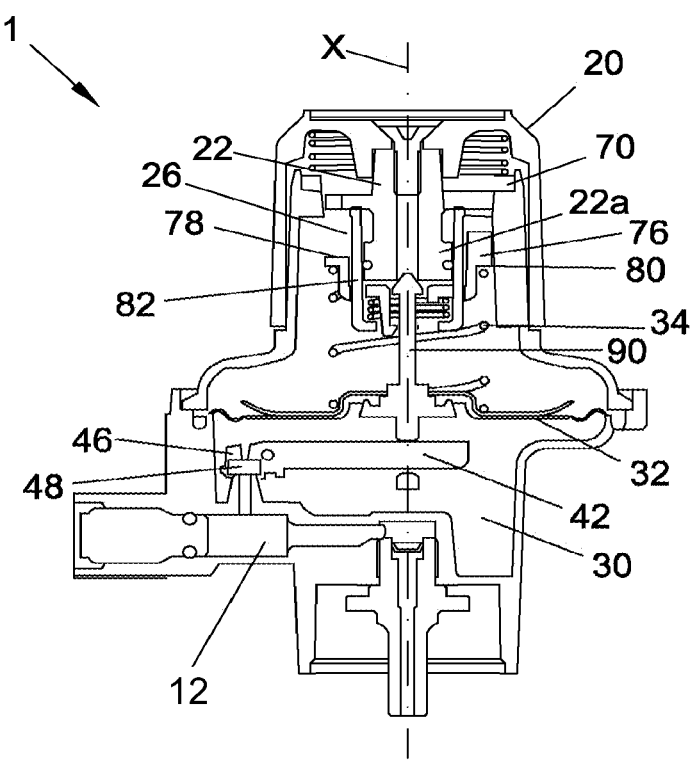
FIG. 15 shows the cross-sectional view of the device in the fourth operative position in FIG. 14 along the section plane III-III shown in FIG. 2.

One possible operative condition of regulation is shown with reference to FIGS. 14 and 15, which condition is referred to as the fourth operative condition.

This operative condition is achieved by rotating the knob 20 about the main axis X by a predetermined angle as desired, depending on the desired outlet pressure value.

During the rotation of the activation element 20a, the first element 22 is also rotated and the thrust element 26 acts against the inclined surface 78 (cam) of the regulating bush 76, translating said bush 76 along the main axis X. The movement of the regulating bush 76 increases the extent of compression of the helical spring 34 and thus increases the opposing force on the membrane 32.

Preferably, the gas is supplied to the appliance at a pressure P2 higher than the previous operative condition of minimum supply.

Clearly, the extent of the angle of rotation of the knob 20 will result in the corresponding regulation of the pressure of gas to the appliance.

In the preferred embodiment shown and described, a continuous fine regulation of the pressure of the gas to the appliance can advantageously be achieved by having the inclined surface 78 at a substantially constant and continuous inclination.

The above description therefore shows that the control device 1 according to the invention enables a better level of pressure regulation to be achieved than systems of the known type.

The regulating device according to the invention is also easier to operate than systems of the known type.

It is clear that, in order to return the supply device 1 to the first operative position, that is to say in order to close the device 1, it will be sufficient to perform the operations described above in the reverse order simply by acting on the knob 20 by means of rotation and/or translation operations opposite to those described.

It has therefore been proved that the present invention enables the intended aims to be achieved. In particular, it provides a device for controlling the supply of a gas that makes it possible to achieve a level of pressure regulation better than that achieved with systems of the known type.

Although the present invention has been described with reference to the particular embodiment represented in the figures, it should be noted that the present invention is not limited to the particular embodiment represented and described; on the contrary, further variations of the embodiment described fall within the scope of the present invention, which scope is defined by the claims.

The invention claimed is:

1. A device for controlling the supply of a gas, the device comprising:
   an inlet connectable to a source of a gas that has a predetermined inlet pressure and a supply outlet for supplying said gas at an outlet pressure, said supply outlet being connectable to an appliance;
   a main body in which a regulating chamber that communicates with said inlet and said supply outlet is defined;
   a pressure regulation membrane arranged in said regulating chamber and a resilient opposition member that is associated with said pressure regulation membrane and generates an opposing force on said pressure regulation membrane when said gas in said regulating chamber compresses said pressure regulation membrane;
   an opening/closing device for opening/closing said supply outlet;
   an actuating unit for manually actuating said opening/closing device, said actuating unit being moveable with respect to a main axis and comprising an activation element that is manually actuatable by a user, said activation element being configured to be actuated by at least one translation movement along said main axis and by at least one rotational movement about said main axis;
   an actuation shaft which is rigidly connected to the membrane and can move by the translation of said activation element, said actuation shaft being configured to interact with an obstructing portion for obstructing a flow of gas to the supply outlet in order to open and/or close said supply outlet;
   wherein said actuation unit is operatively connected to said opening/closing device in order to open/close said supply outlet and said actuation unit is also operatively connected to said resilient opposition member and comprises a regulating device for regulating said resilient opposition member, said regulating device varies said opposing force, said regulating device comprising a cam element positioned in contact with said resilient opposition member, said opening/closing device comprises a first element which comprises an opposing portion that defines a thrust element rigidly connected to the activation element;
   wherein said opening/closing device comprises an indexer disc connected to the main body, the indexer disc comprising a reference opening through which the thrust element can pass when the first element is positioned, by rotation of the activation element, in a predetermined angular position about said main axis;
   the opposing portion and the reference opening being designed such that:
   during an opening action, the activation element is actuatable by a translation movement in a first direction along the main axis, bringing the device from a second operative position, in which the thrust element is not in contact with the cam element and the first element is not in contact with the actuation shaft, to a third operative position of the device in which the first element is in contact with the actuation shaft so as to move the actuation shaft and the obstructing portion in order to supply gas through said supply outlet at a predetermined outlet pressure;
   during a regulating action, the first element is moveable by the rotational movement about said main axis from the third operative position to a fourth operative position of the device, during said rotational movement, the thrust element abuts the cam element to cause the cam element to translate, so as to vary the opposing force and the outlet pressure in relation to the predetermined outlet pressure.

2. The device according to claim 1, wherein said activation element comprises a knob.

3. The device according to claim 1, wherein said cam element is moved by said activation element during said at least one rotational movement, in a translation direction along said main axis.

4. The device according to claim 1, wherein the opposing portion and the reference opening are designed such that, in a first operative position in which the thrust element is not aligned with the reference opening so as to prevent the thrust element from passing through said reference opening, limiting the possibility of translating the activation element in the first direction along the main axis.

5. The device according to claim 1, wherein said opening/closing device comprises a lever, a first arm of said lever being operatively connected to said actuation unit and a second arm of said lever comprising said obstructing portion for obstructing said inlet.

6. The device according to claim 5, wherein said actuation unit is operatively connected to said lever by means of said actuation shaft.

7. The device according to claim 6, wherein said actuation shaft is moved by said activation element during said at least one translation movement.

8. The device according to claim 1, wherein said resilient opposition member comprises a helical spring.

9. A method for controlling the supply of a gas between a source and an appliance by the device according to claim 1, the method comprising:
   actuating said actuation unit by a first translation movement in a first direction along said main axis in order to open said inlet and initiate the supply of gas to said appliance through said supply outlet at a predetermined outlet pressure;
   actuating said actuation unit by a rotational movement about said main axis in order to regulate the magnitude of said outlet pressure.

10. The method according to claim 9, further comprising actuating said actuation unit by a translation movement in a second direction along said main axis, opposite to said first direction, in order to close said inlet and stop said supply of gas.

11. The method according to claim 10, comprising releasing the opening/closing device, before said first translation movement of said actuation unit, by actuating said actuation unit by means of a rotational movement about said main axis.

12. The method according to claim 9, wherein actuating said actuation unit in order to open said inlet comprises positioning the activation element of the actuation unit in a predetermined angular position about the main axis of rotation so as to allow the thrust element to pass through said reference opening.

13. The method according to claim 12, wherein actuating said actuation unit in order to regulate the magnitude of said outlet pressure comprises translating said cam element along said main direction by abutting said thrust element by rotating said actuation unit.

14. A device for controlling the supply of a gas, the device comprising:
- an inlet connectable to a source of a gas that has a predetermined inlet pressure and an outlet for supplying said gas at an outlet pressure, said outlet connectable to an appliance;
- a main body in which a regulating chamber that communicates with said inlet and said outlet is defined;
- a shaft configured to interact with an obstructing portion for obstructing a flow of gas to the outlet in order to open and/or close said outlet;
- a membrane arranged in said regulating chamber and a resilient opposition member that is associated with said membrane and generates an opposing force on said membrane when said gas in said regulating chamber compresses said membrane;
- an opening/closing device for opening/closing said outlet,
- an actuation unit for manually actuating said opening/closing device, said actuation unit being moveable with respect to a main axis;
- said actuation unit being operatively connected to said opening/closing device in order to open/close said inlet and said actuation unit is also operatively connected to said resilient opposition member and comprises a regulating device for regulating said resilient opposition member, said regulating device varying said opposing force, said regulating device comprising a cam element positioned in contact with said resilient opposition member, wherein said actuation unit comprises an activation element that is manually actuatable by a user, said activation element configured to be actuated by at least one translation movement along said main axis and by at least one rotational movement about said main axis, said opening/closing device comprising a first element operated by said activation element and defining a thrust element, said opening/closing device comprising an indexer comprising a reference opening through which the thrust element can pass when the first element is positioned, by a rotation of the activation element, in a predetermined angular position about said main axis;

wherein the first element and the reference opening are designed such that:

during an opening action, the activation element is actuatable by a translation movement in a first direction along the main axis, bringing the device from a second operative position, in which the thrust element is not in contact with the cam element and the first element is not in contact with the shaft, to a third operative position of the device in which the first element is in contact with the shaft so as to move the shaft and the obstructing portion in order to supply gas through said outlet at a predetermined outlet pressure;

during a regulating action, the first element is moveable by the rotational movement about said main axis from the third operative position to a fourth operative position of the device, during said rotational movement, the thrust element abuts the cam element to cause the cam element to translate, so as to vary the opposing force and the outlet pressure in relation to the predetermined outlet pressure.

* * * * *